US012324784B2

(12) United States Patent
Liu et al.

(10) Patent No.: US 12,324,784 B2
(45) Date of Patent: Jun. 10, 2025

(54) PRESSURE FIELD GENERATOR AND STIMULATION DEVICE INCLUDING THE SAME

(71) Applicant: HYTTO PTE. LTD., Singapore (SG)

(72) Inventors: Dan Liu, Guangdong (CN); Jilin Qiu, Guangdong (CN); Zhiwen Wu, Guandong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/744,856

(22) Filed: Jun. 17, 2024

(65) Prior Publication Data

US 2024/0335350 A1 Oct. 10, 2024

Related U.S. Application Data

(63) Continuation-in-part of application No. 18/400,273, filed on Dec. 29, 2023, now Pat. No. 12,036,172, and a continuation-in-part of application No. 18/385,180, filed on Oct. 30, 2023, now Pat. No. 12,042,460, and a continuation-in-part of application No. 18/384,295, filed on Oct. 26, 2023, and a continuation-in-part of (Continued)

(51) Int. Cl.
*A61H 19/00* (2006.01)

(52) U.S. Cl.
CPC ..... *A61H 19/44* (2013.01); *A61H 2201/0153* (2013.01); *A61H 2201/018* (2013.01); *A61H 2201/1215* (2013.01); *A61H 2201/149* (2013.01); *A61H 2201/1664* (2013.01); *A61H 2201/5058* (2013.01)

(58) Field of Classification Search
CPC ..................................................... A61H 19/34
See application file for complete search history.

(56) References Cited

U.S. PATENT DOCUMENTS 5,725,473 A 3/1998 Taylor
9,849,061 B2 12/2017 Lenke (Continued)

FOREIGN PATENT DOCUMENTS

FR 2746639 A1 10/1997

OTHER PUBLICATIONS

U.S. Appl. No. 18/491,232, filed Oct. 20, 2023.

(Continued)

*Primary Examiner* — Thaddeus B Cox
(74) *Attorney, Agent, or Firm* — F. CHAU & ASSOCIATES, LLC

(57) ABSTRACT

A device for stimulating an erogenous zone of a human body includes a housing, a driver disposed inside the housing, and a pressure field generator disposed at least partially inside the housing. The pressure field generator includes a continuous cavity having a movable end and a stimulating end opposite thereto, the continuous cavity defined by a tube wall connecting the movable end and the stimulating end portion. At least a portion of the tube wall is an axial-length-variable tubular structure. A pusher is configured to close the movable end and to drive the movable end in a reciprocating manner using a force of the driver. The stimulating end portion has an opening of the continuous cavity configured to engage with an erogenous zone of a human body. A guide assembly is configured to limit lateral motion of the movable end portion.

16 Claims, 10 Drawing Sheets

Related U.S. Application Data application No. 18/491,232, filed on Oct. 20, 2023, now Pat. No. 12,042,459, which is a continuation-in-part of application No. 18/153,423, filed on Jan. 12, 2023, now Pat. No. 11,833,100, said application No. 18/385,180 is a continuation of application No. 17/968,463, filed on Oct. 18, 2022, now Pat. No. 11,833,102.

(56) References Cited

U.S. PATENT DOCUMENTS

| | | | | |
|---|---|---|---|---|
| 2014/0046127 A1* | 2/2014 | Topolovac | ............. | A61H 23/04 600/38 |
| 2016/0354277 A1* | 12/2016 | Fima | ...................... | A61H 19/44 |
| 2023/0210717 A1 | 7/2023 | Witt | | |

OTHER PUBLICATIONS

U.S. Appl. No. 18/153,423, filed Jan. 12, 2023 (issued on Dec. 5, 2023 as U.S. Pat. No. 11,833,100).
U.S. Appl. No. 18/400,273, filed Dec. 29, 2023.
U.S. Appl. No. 18/385,180, filed on Oct. 30, 2023 (published on Apr. 18, 2024 as U.S. 2024/0122790).
U.S. Appl. No. 17/968,463, filed Oct. 18, 2022 (Issued on Dec. 5, 2023 as U.S. Pat. No. 11,833,102).
U.S. Appl. No. 18/384,295, filed Oct. 26, 2023.

* cited by examiner

PRESSURE FIELD GENERATOR AND STIMULATION DEVICE INCLUDING THE SAME

CROSS REFERENCE TO RELATED APPLICATION

This application is a Continuation-in-Part of U.S. patent application Ser. No. 18/491,232, filed on Oct. 20, 2023 (issued as U.S. Pat. No. 12,042,459 on Jul. 23, 2024), which is a Continuation-in-Part of U.S. patent application Ser. No. 18/153,423, filed on Jan. 12, 2023 (issued on Dec. 5, 2023 as U.S. Pat. No. 11,833,100); this application is also a Continuation-in-Part of U.S. patent application Ser. No. 18/400,273, filed on Dec. 29, 2023 (issued as U.S. Pat. No. 12,036,172 on Jul. 16, 2024); this application is also a Continuation-in-Part of U.S. patent application Ser. No. 18/385,180, filed on Oct. 30, 2023 (issued as U.S. Pat. No. 12,042,460 on Jul. 23, 2024), which is a Continuation of U.S. patent application Ser. No. 17/968,463, filed on Oct. 18, 2022 (Issued on Dec. 5, 2023 as U.S. Pat. No. 11,833,102); this application is also a Continuation-in-Part of co-pending U.S. patent application Ser. No. 18/384,295, filed on Oct. 26, 2023; the entire contents of which are herein incorporated by reference.

TECHNICAL FIELD

The present disclosure relates to a sexual stimulation device and, more specifically, to a pressure field generator and a sexual stimulation device utilizing the pressure field generator.

DISCUSSION OF THE RELATED ART

Various sexual stimulation devices may make use of a wide variety of mechanical means for providing a desired type of sexual stimulation to a user. For example, some devices may vibrate, some may wiggle or articulate, some may provide reciprocating motion, and still others may provide intermittent suction. Those sexual stimulation devices that are designed to provide intermittent suction may include a pressure generating chamber, which may be referred to as an air cylinder or a pressure field generator, that is configured to contract and expand its volume so as to produce intermittent suction. This pressure field generator may be open to the ambient environment so as to deliver the provided suction to the user as desired. To prevent the generated suction from drawing liquid or moisture into the internal mechanism of the device, where it may cause corrosion and other forms of damage thereto, an impermeable barrier may be used to protect the internal mechanisms of the device from the pressure generating chamber. As the pressure field generator may expand and contract in volume, the impermeable barrier is generally capable of stretching and folding. However, this may create crevices that are difficult to clean between uses and may lead to unsightly and unhygienic properties.

SUMMARY

A device for stimulating an erogenous zone of a human body includes a housing, a driver disposed inside the housing, and a pressure field generator disposed at least partially inside the housing. The pressure field generator includes a continuous cavity having a movable end and a stimulating end opposite thereto, the continuous cavity defined by a tube wall connecting the movable end and the stimulating end portion. At least a portion of the tube wall is an axial-length-variable tubular structure. A pusher is configured to close the movable end and to drive the movable end in a reciprocating manner using a force of the driver. The stimulating end portion has an opening of the continuous cavity configured to engage with an erogenous zone of a human body. A guide assembly is configured to limit lateral motion of the movable end portion.

A device for stimulating an erogenous zone of a human body includes a housing, a driver disposed inside the housing, and a pressure field generator disposed at least partially inside the housing. The housing includes a continuous cavity having a movable end and a stimulating end opposite thereto, the continuous cavity defined by a tube wall connecting the movable end and the stimulating end. At least a portion of the tube wall is an axial-length-variable tubular structure. A pusher is configured to close the movable end and to drive the movable end in a reciprocating manner using a force of the driver. The stimulating end is integrally molded with the tube wall and has an opening of the continuous cavity configured to engage with an erogenous zone of a human body.

A pressure field generator includes a continuous cavity having a movable end and a stimulating end opposite to the movable end, the continuous cavity being defined by a tube wall connecting the movable end and the stimulating end. At least a portion of the tube wall is an axial-length-variable tubular structure. A pusher is configured to close the movable end and to drive the movable end into reciprocating motion by force of a motor. The stimulating end is integrally molded with the tube wall and the tube wall has an opening configured to engage with an erogenous zone of a human body. The pusher includes a rigid column arranged at the movable end, and a coupling configured to couple to the motor.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
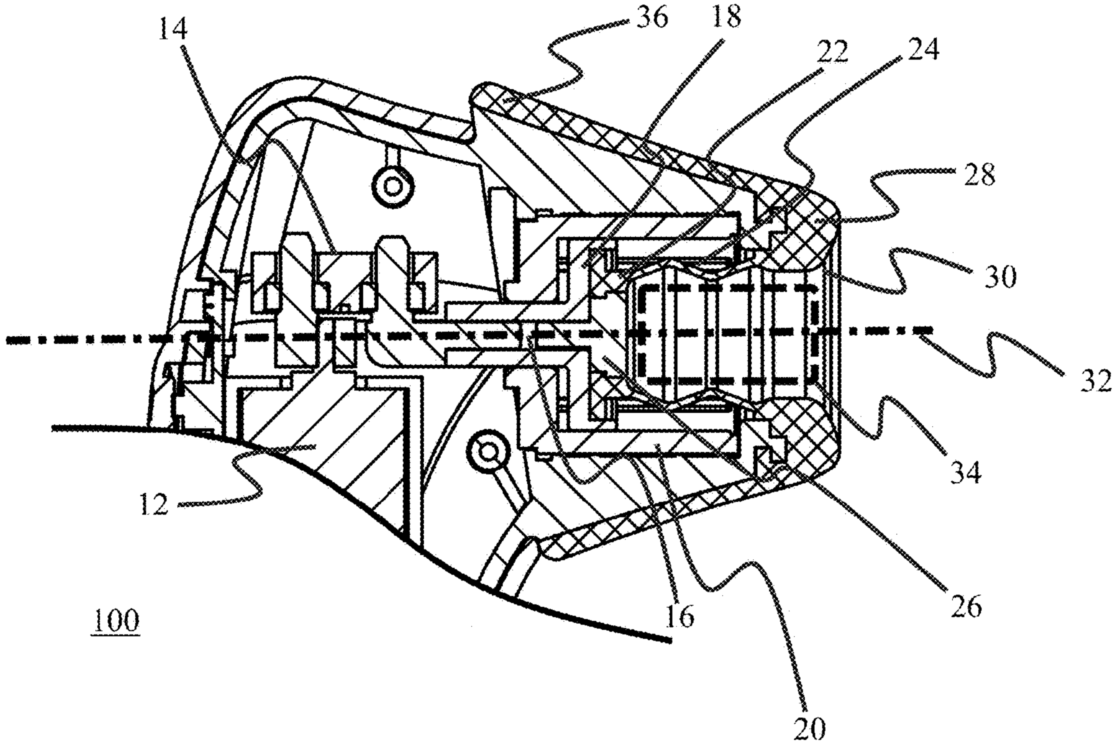
FIG. 1 is a cross-sectional cutaway view of a top portion of a sexual stimulation device in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

It is to be understood that the elements illustrated and described with respect to one figure may be mixed and matched with the elements illustrated and described with respect to another figure and elements that appear to look similar in one figure to elements that are described with respect to another figure may be assumed to be at least similar to those corresponding elements.

Exemplary embodiments of the present disclosure relate to a stimulation device that provides sexual stimulation to a user by the generation of intermittent pressure using a pressure field generator. While some sexual stimulation devices may make use of an internal impermeable barrier that is disposed deep within the sexual stimulation device, exemplary embodiments of the present invention may make use of a flexible head unit that may be superficially arranged within the sexual stimulation device and is capable of expanding and contracting in volume so as to generate intermittent suction while standing as an impermeable barrier that protects internal mechanisms of the device from the ambient environment in which the sexual stimulation device is used. The flexible head unit may make up the pressure field generator along with various other components that are discussed in more detail herein. The flexible head unit may also be removable so as to allow for better cleaning and/or interchange so as to preserve cleanliness and good hygiene.

FIG. 1 is a cross-sectional cutaway view of a top portion of a sexual stimulation device 100 in accordance with exemplary embodiments of the present disclosure. As may be appreciated from this figure, the sexual stimulation device 100 includes a flexible head unit that forms a pressure field generator 34. The flexible head unit includes several parts that may be integrally formed so as to be a singular uninterrupted unit without physical delineation between its constituent elements. These constituent elements are, however, described as distinct parts so as to provide a more meaningful description. It is to be understood that these distinct parts may be formed together, for example, by injection molding or some other fabrication process. It is also to be understood that these distinct parts may be separately formed and then bonded together using adhesives.

The flexible head unit may be made of a material that is soft, flexible, and impermeable to fluid. For example, the flexible head unit may include a natural rubber or a synthetic rubber such as styrene-butadiene rubber (SBR), nitrile rubber (NBR), polychloroprene (CR)/neoprene, ethylene propylene diene monomer (EPDM), fluoroelastomers (FKM), silicone rubber (SiR), hlorosulfonated polyethylene (CSM)/Hypalon, etc.

The flexible head unit includes a flexible stimulation front 28 that is configured to make contact with an erogenous zone of a user, such as the clitoris. The flexible stimulation front 28 may have an opening 30 for receiving the erogenous zone. The flexible stimulation front 28 may also have a flexible shield 36 that extends outwardly from the flexible stimulation front 28 and covers a front of the device 100 so as to serve as an easily cleanable barrier or hood for protecting the device from exposure and to provide a smooth soft surface for protecting sensitive areas of the user's body from abrasion.

The flexible head unit may further include flexible bellows 24 that extend inwardly from the flexible stimulation front 28 and make up sidewalls of the pressure field generator 34. These flexible bellows 24 allow for the pressure field generator 34 to expand and contract in volume, while the device 100 is in use, without compromising the impermeability of the flexible head unit. The bellows 24 continue to a flexible back 22, which forms a back part of the flexible head unit. Together, the flexible back 22, the flexible bellows 24, and the flexible stimulation front 28 form the singular uninterrupted structure of the flexible head unit and create an easy-to-clean impermeable barrier that is superficially arranged within the device 100 so as to allow for good accessibility to the user so that the device 100 may be easily cleaned and kept in a sanitary condition for continued use.

Figure 5A:
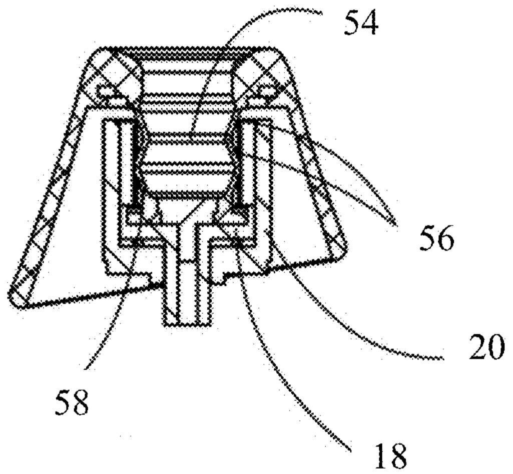
FIG. 5A is a cross-sectional cutaway view of a removable portion of the sexual stimulation device in accordance with exemplary embodiments of the present invention.

The flexible bellows may either be straight, folding into triangles as depicted, or curved so as to fold into waves. As the bellows 24 may be relatively short, they need not include very many folds. Assuming one outward edge plus one inward edge constitutes one full period of the bellows, the bellows may consist of 1.5 periods, as depicted, with one upwardly slanted wall followed by one downwardly slanted wall followed by one upwardly folded wall. Exemplary embodiments of the present invention are not necessarily limited to this arrangement and may have 1, 2, 2.5, or more periods of bellows 24. The various slanted walls may join with one another at a circumferential fold line 54, as is depicted in FIG. 5A. This design allows the bellows 24 to encompass a significant portion of the pressure field generator 34 and with this reduced number of folds, for example, 1.5 periods, it may be difficult for a user to identify any sheltered areas within the pressure field generator 34 when looking thorough the opening 30, minimizing hygienic dead space that is difficult to clean and enhancing the visual user experience. The length of each slanted section may be between 1 mm to 10 mm in length, making each full period equal to 2 mm to 20 mm in length, and the total surface length of the bellows equal to, for example, 3 mm to 300 mm.

The flexible head unit structure may be referred to herein as a continuous cavity as it forms a singular structure of a cavity with one end being a stimulation end and the other end being a movable end.

While exemplary embodiments of the present disclosure are described as having bellows, it is to be understood that the bellows may be replaced with an axially deformable hose or tube which is capable of being stretched and relaxed without rupture. However, both the bellows and the axially deformable hose may be referred to herein as an axial-length-variable tubular structure as it is a tube that can change its axial length without risk of rupture.

The flexible back 22 of the flexible head unit is gripped between a rigid plug 26 and pusher 18. The rigid plug 26 and the pusher 18 may each be made of a hard plastic material and may each be rigid. The hard plastic may include high-density polyethylene (HDPE), polypropylene (PP), polyvinyl chloride (PVC), polystyrene (PS), acrylonitrile butadiene styrene (ABS), etc. The rigid plug 26 may have an exterior surface that closes the rear of the flexible head unit and is itself exposed to the ambient environment and forms part of the pressure filed generator 34. The rigid plug 26 may be pressed against and fixed to the pusher 18 so as to move as a single unit while closing the pressure field generator 34 at its interior and creating the impermeable marrier.

The pusher 18 may be configured to push the flexible back 22 of the flexible head unit so as to reduce the volume of the pressure filed generator 34 and to pull the flexible back 22 so as to expand the volume of the pressure filed generator 34 and in this way deliver stimulation to the erogenous zone of the user while protecting internal components of the device 100 from exposure to the ambient environment.

The pusher 18 may be coupled to a transfer arrangement 14 that will be described in greater detail below. The transfer arrangement 14 is configured to provide mechanical force to the pusher 18 which is coupled thereto by a coupling 16. The coupling 16 may be configured to allow the rigid plug 26 and the flexible head unit to be detached from the remainder of the device 100 for cleaning, as will be described in greater detail below.

The pusher 18 may be configured to slide within a stationary backing 20 and the stationary backing 20 may serve as a guide so as to limit the motion of the pusher to forward and backward while stabilizing the pusher 18 from any lateral motion. The pusher 18 may slide against the backing 20 with or without interlocking pins and grooves, rails, etc.

Because the diameter of the pusher 18 is greater than the diameter of the bellows 24 by a predetermined margin, even when the bellows 24 are in their compressed state 24*b*, they are still spaced apart from the stationary backing 20 so that even if the device 100 is justled while in use, the outward-facing walls 58 of the bellows 24 still could not come into contact with the stationary backing 20 and this reduces the risk of the bellows 24 wearing out as a result of rubbing against the internal components of the device. Moreover, because the risk of rubbing is minimized, the stroke of the device may be increased so as to provide heightened stimulation to the user.

The transfer arrangement 14 is configured to transfer a spinning motion of a motor 12 to reciprocating motion of the pusher 18 in a manner that is described in greater detail below. The motor 12 is an example of a driver which may be used to generate the driving force, however, other forms of drivers may be used.

Figure 2:
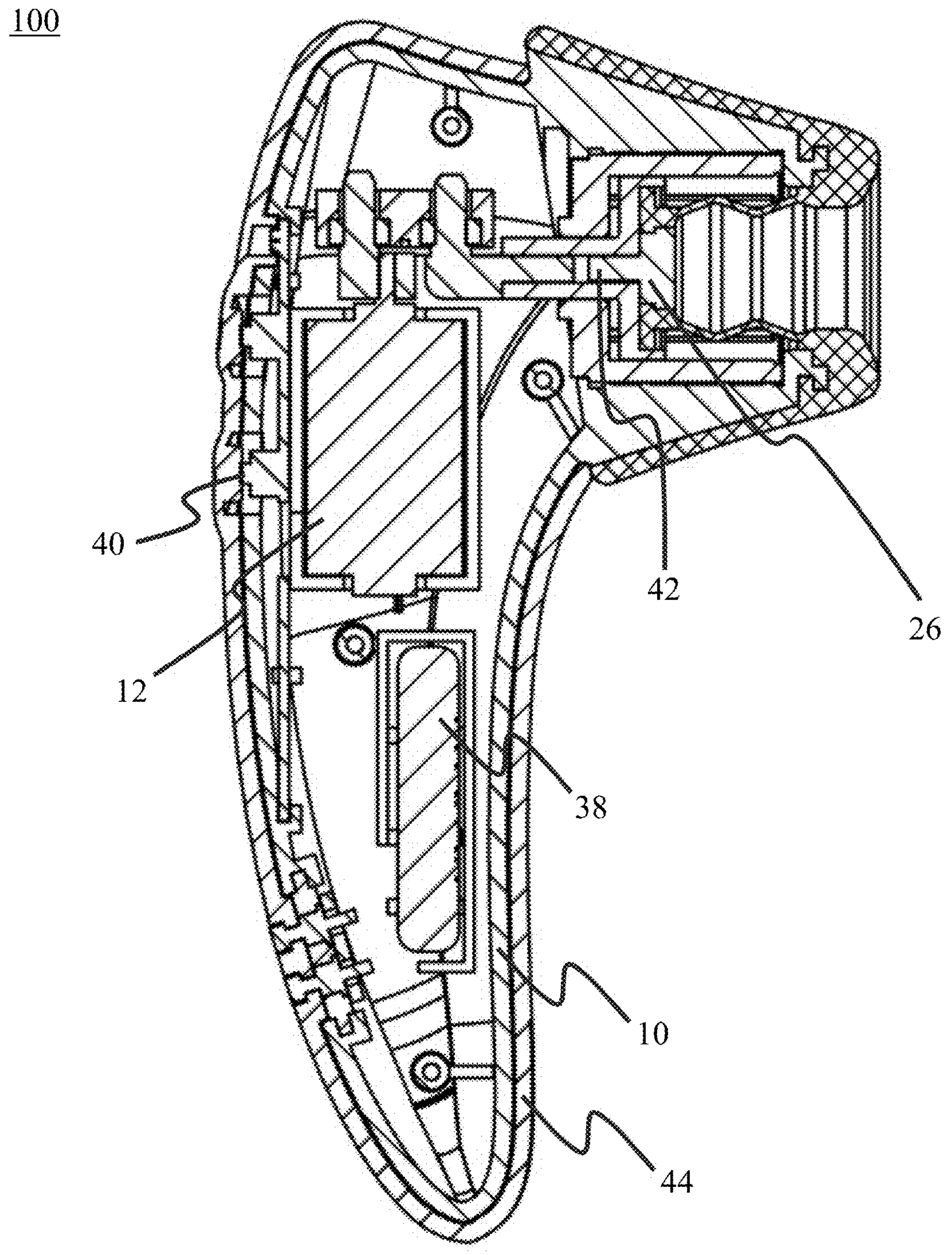
FIG. 2 is a cross-sectional cutaway view of a sexual stimulation device in accordance with exemplary embodiments of the present disclosure.

FIG. 2 is a cross-sectional cutaway view of a sexual stimulation device in accordance with exemplary embodiments of the present disclosure. The sexual stimulation device 100 can be seen in this figure to have a housing 10 that can be made of a hard plastic, such as one discussed above, or a material with properties that are strong and light-weight, including metal. The housing 10 may be covered in a skin or cover material 44 that might provide a waterproof exterior and a good gripping surface and may include a natural or synthetic rubber such as those discussed above, or a soft plastic that may have a textured surface. Examples of suitable soft plastics include, but are not limited to being, polyvinyl chloride (PVC), low-density polyethylene (LDPE), high-density polyethylene (HDPE), polypropylene (PP), polyurethanes (PU), etc.

While the housing 10 may be arranged around an entirety of the device 100, the cover 44 may end at the flexible shield 36. Moreover, a power source 38, such as a battery, may be disposed within the housing 10, along with the aforementioned motor 12 and the other internal components of the device 100 such as a controller circuit, a charging circuit for recharging the power source, and the other elements discussed herein. There may also be one or more controls 40 that may be accessible to the user for adjusting the operational mode of the device. The controls 40 may include buttons, as shown, a display screen, a touchscreen, knobs, data/power connectors, etc.

As can also be seen from this figure, the rigid plug 26 may have a rigid column 42 section that extends into the pusher 18 so as to allow the pusher 18 to more easily ad stably push and pull upon the flexible head unit.

Figure 3:
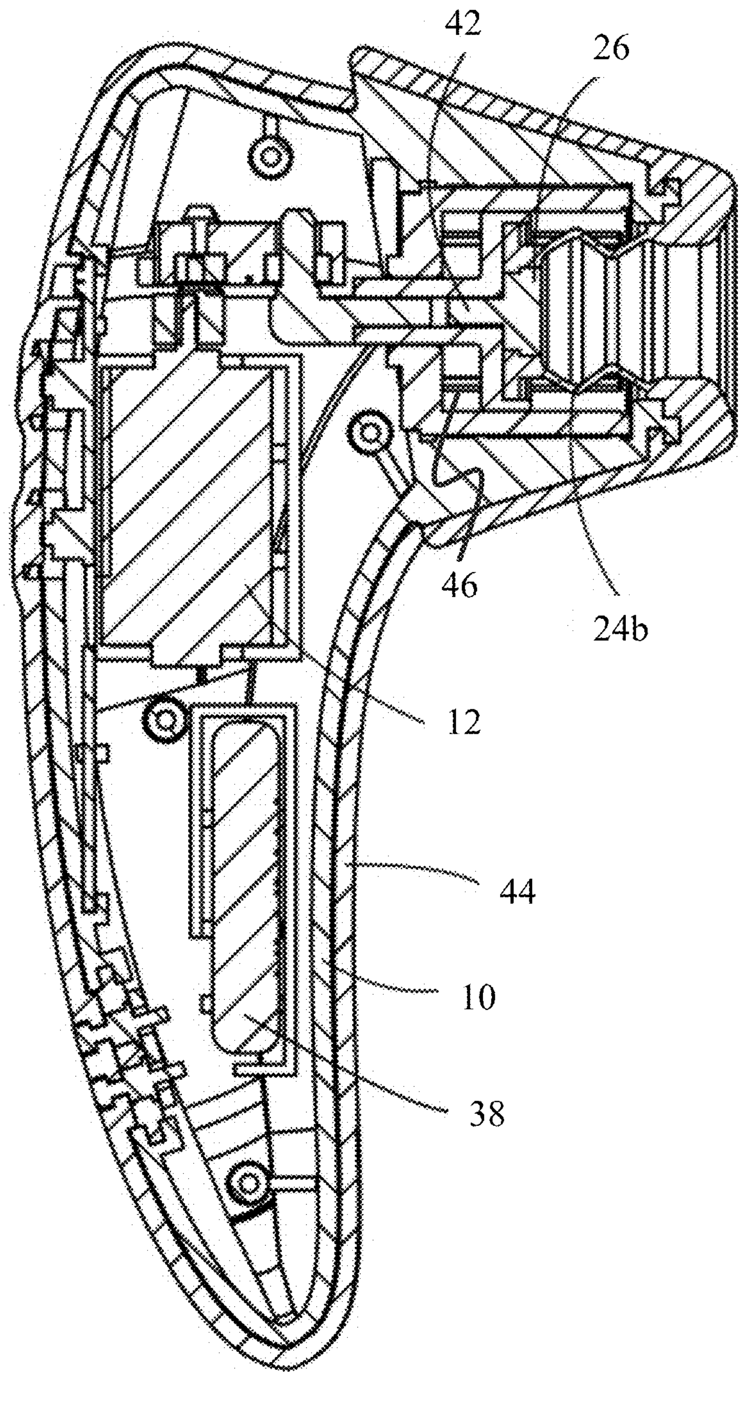
FIG. 3 is a cross-sectional cutaway view of a sexual stimulation device with the pressure field generator in an expanded-volume state in accordance with exemplary embodiments of the present disclosure.

FIG. 3 is a cross-sectional cutaway view of a sexual stimulation device with the pressure field generator 34 in an expanded-volume state in accordance with exemplary embodiments of the present disclosure. As can be seen from this picture, the rigid plug 26 and its rigid column 42 along with the flexile back 22 are in a state that is drawn back so that the bellows 24 are in an extended state 24*b*. In this way, the pressure field generator 34 has its greatest volume.

One or more elastic restorers may connect the pusher 18 to the stationary backing 20 such that the elastic restorers can exert a restoring force upon the pusher so as to pull the bellows 24 back to an extended state 24*b* from its compressed state 24*a*. Alternatively, or additionally, one or more elastic restorers may connect the pusher 18 to the head unit base 62 so as to pull the bellows 24 back to a compressed state 24*a* from its extended state 24*b*.

One or more elongate ribs 46 may be used as guides for the motion of the pusher 18 within the stationary backing 20 so that lateral motion is prevented and the pusher 18 can only move forward and backward in a reciprocating fashion. These elongate ribs 46 may act as lead rails that run the entire length of travel of the pusher 18. The elongate ribs 46 may surround the flexible bellows 24. The pusher may engage with the elongate ribs so as to confine lateral motion. The elongate ribs 46 may be but one example of a guide assembly that is used to limit lateral motion and sway.

It can also be appreciated from this figure that even when the pressure field generator 34 has its greatest volume, the entirety of the flexible bellows and the rigid plug 26, which make up the interior of the pressure field generator 34 that is exposed to the ambient environment, is relatively close to the opening 30 so that the interior may be easily accessed and cleaned as needed, either by its removal from the remainder of the device 100 or while in place. For example, the flexible back 22 of the flexible head unit does not reach as far back as even the flexible shield 36. For example, the flexible back 22 does not extend beyond half of the distance from the opening 30 to the rear of the casing 10 along the central axis 32 of the pressure field generator 34, even in its state of maximum volume.

As can be seen from the figures above, the pressure field generator 34 and opening 30 may have radial symmetry about the central axis 32 and the alternating positive and negative pressure generated by the pressure field generator 34 may accordingly be projected in the direction of the central axis. Thus, in use, the opening 30 may be placed over the erogenous areas of the user in such a way as to correspond to the central axis 32 so that maximum positive and negative pressure is applied thereto. However, the device 100 may also be held at an angle with respect to the erogenous zone so as to vary the sensation of pressure applied thereto, as desired.

Figure 4:
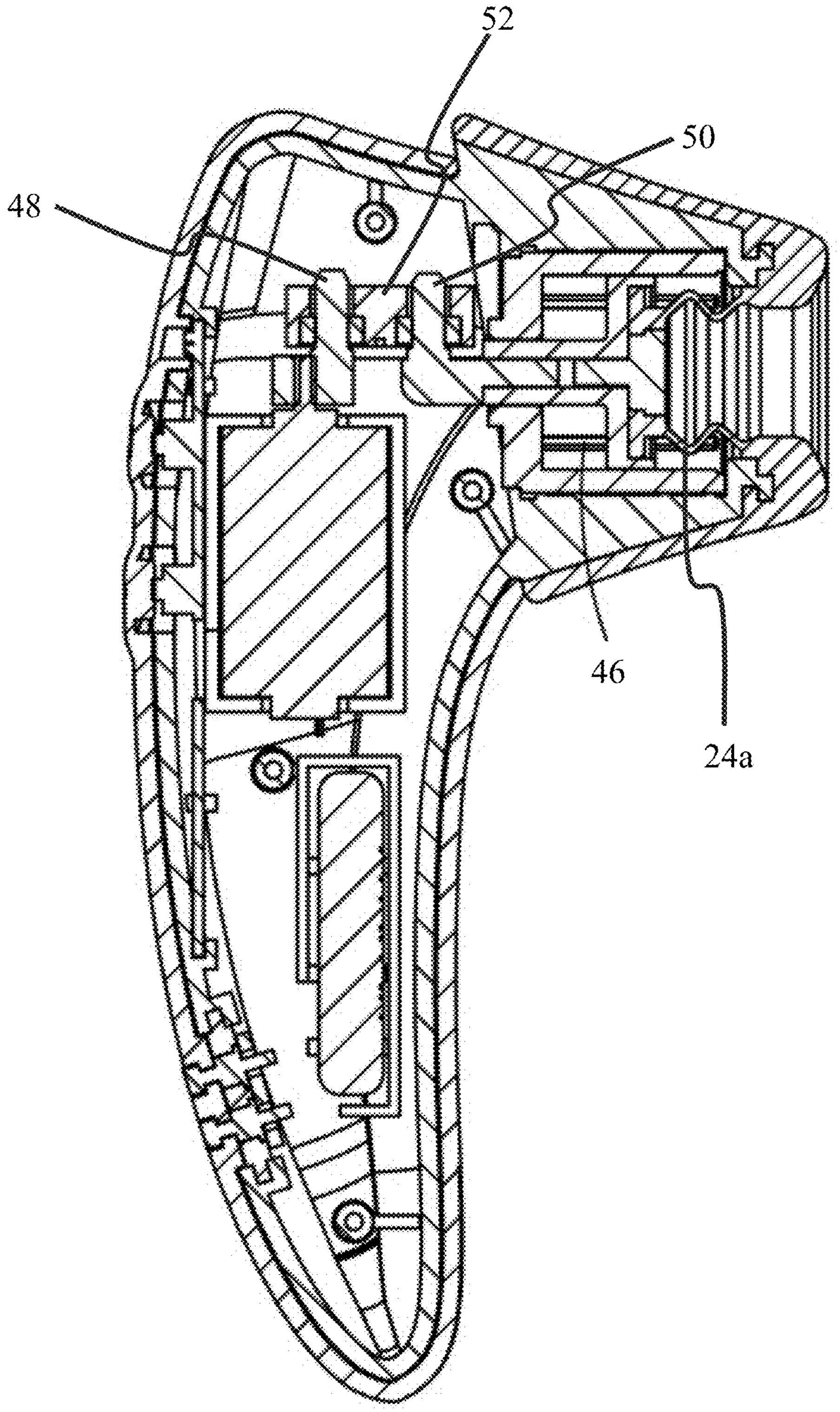
FIG. 4 is a cross-sectional cutaway view of a sexual stimulation device with the pressure field generator in a contracted-volume state in accordance with exemplary embodiments of the present disclosure.

FIG. 4 is a cross-sectional cutaway view of a sexual stimulation device with the pressure field generator 34 in a contracted-volume state in accordance with exemplary embodiments of the present disclosure. As can be seen from this figure, the bellows 24 are in its compressed state 24*a* so as to minimize the volume of the pressure field generator 34. The device 100 may accordingly generate its sucking affect by alternating between the states of expanded and contracted volume of the pressure field generator 34.

This figure may also be used to explain how the transfer arrangement 14 works. The transfer arrangement 14 includes a plug-side arm 50 that is removably coupled to the rigid collum 42 of the rigid plug 26 by the coupling 16. The spinning of the motor 12 turns a motor-side arm 48 of the transfer arrangement 14. As the motor-side arm 48 revolves around the motor's 12 output shaft, it pushes and pulls on a joiner 52 that, in turn, pushes and pulls on the plug-side arm 50 so as to drive the reciprocating motion of the pusher 18. The joiner 52 may be embodied as a connecting rod.

While the transfer arrangement 14 may include a crank link mechanism, it is noted that in the transfer arrangement 14 described above, there is no risk of the rotating joiner 52 creating a lateral swing to bellows 24. This stands in contrast to prior approaches in which the crank link mechanism that is used to transfer motion from a motor to the bellows may create a lateral swing to the bellows which may cause them to rub up against the surrounding structure leading to the wearing out of the bellows over time. For this reason, the stroke of the bellows is limited when using the prior approach that can create lateral swing, a limitation that is not present in the recited arrangement.

The transfer arrangement 14 is not limited to being a crank link mechanism and may be any other suitable arrangement such as a screw pair, which is a kind of a kinematic pair.

As mentioned above, the flexible head unit may be removable. FIG. 5A is a cross-sectional cutaway view of a removable portion of the sexual stimulation device in accordance with exemplary embodiments of the present invention. As can be appreciated from this figure, the removable portion may include the pusher 18, the stationary backing 20, the rigid plug 26, the flexible back 22, the flexible bellows 24, the flexible stimulation front, and the flexible shield 36. The removable portion may be removed by disengaging the coupling 16. As all of the ambient-exposed surfaces are within this removable portion, cleaning may be simplified. Moreover, the elastic restorer may be used to ensure that the bellows 24 are in the extended state 24*b* when the removable portion is removed so as to further aid in cleaning.

In this extended state 24*b*, the circumferential fold lines 54 of the bellows 24 are open for the easy cleaning of the inward-facing walls 56 of the bellows 24. The outward-facing walls 58 of the bellows 24 may remain inaccessible and free from contamination.

Figure 5B:
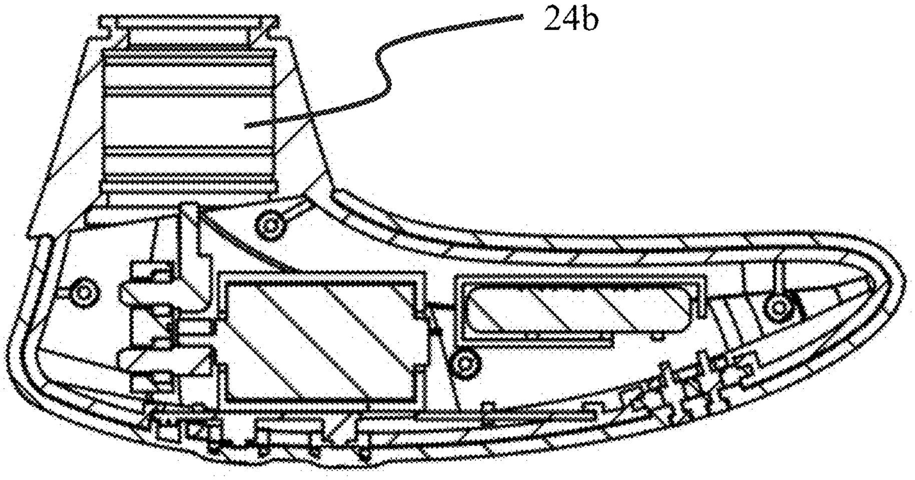
FIG. 5B is a cross-sectional cutaway view of the sexual stimulation device with the removable portion attached thereto in accordance with exemplary embodiments of the present invention.

FIG. 5B is a cross-sectional cutaway view of the sexual stimulation device with the removable portion attached thereto in accordance with exemplary embodiments of the present invention. As can be appreciated form this figure, when in the attached state, the flexible shield 36 overlaps with or is overlapped by the cover skin 44.

Figure 6:
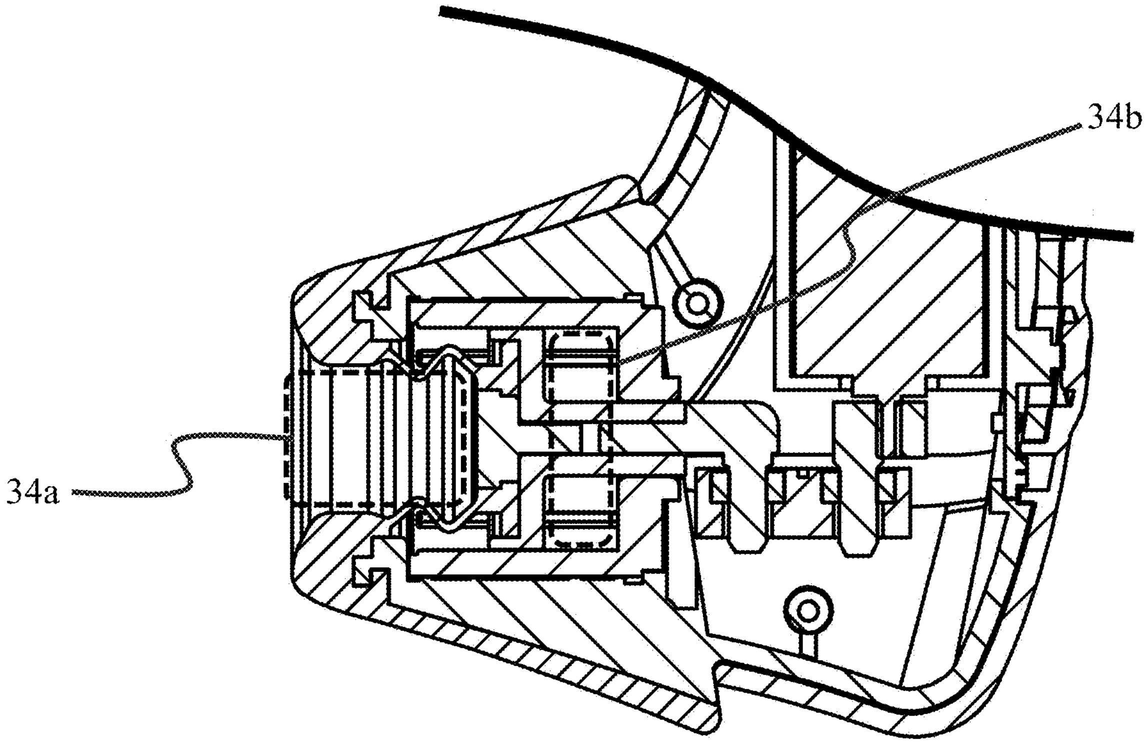
FIG. 6 is a cross-sectional cutaway view of a top portion of a sexual stimulation device in accordance with exemplary embodiments of the present disclosure.

FIG. 6 is a cross-sectional cutaway view of a top portion of a sexual stimulation device 100 in accordance with exemplary embodiments of the present disclosure. As can be appreciated from this figure, the pressure filed generator 34 is comprised of two parts, a front part 34*a* and a back part 34*b*. The back part 34*b* would tend to have the opposite pressure environment from that of the front part 34*a*. For example, when the bellows 24 are extended 24*b*, pressure becomes low in the front part 34*a* and high in the back part 34*b* and when the bellows 24 are compressed 24*a*, the pressure becomes high in the front part 34*a* and low in the back part 34*b*. The total volume of the front part 34*a* plus the back part 34*b* may remain constant throughout the operational cycle of the device 100. The front part 34*a* is open and so pressure remains balanced therein by the sucking and blowing of air from the opening 30. To balance out the pressure in the back part 34*b*, a tube may connect the back part 34*b* to the outside of the device 100 and so air may be drawn in and vented out from the back part 34*b* through this tube. This structure may be referred to as an air escape structure and the outlet to the air escape structure may be disposed far from the opening 30 so as to prevent the possibility of ambient fluid infiltration. The outlet may additionally utilize valves and/or membranes to further prevent fluid infiltration therethrough.

Figure 7:
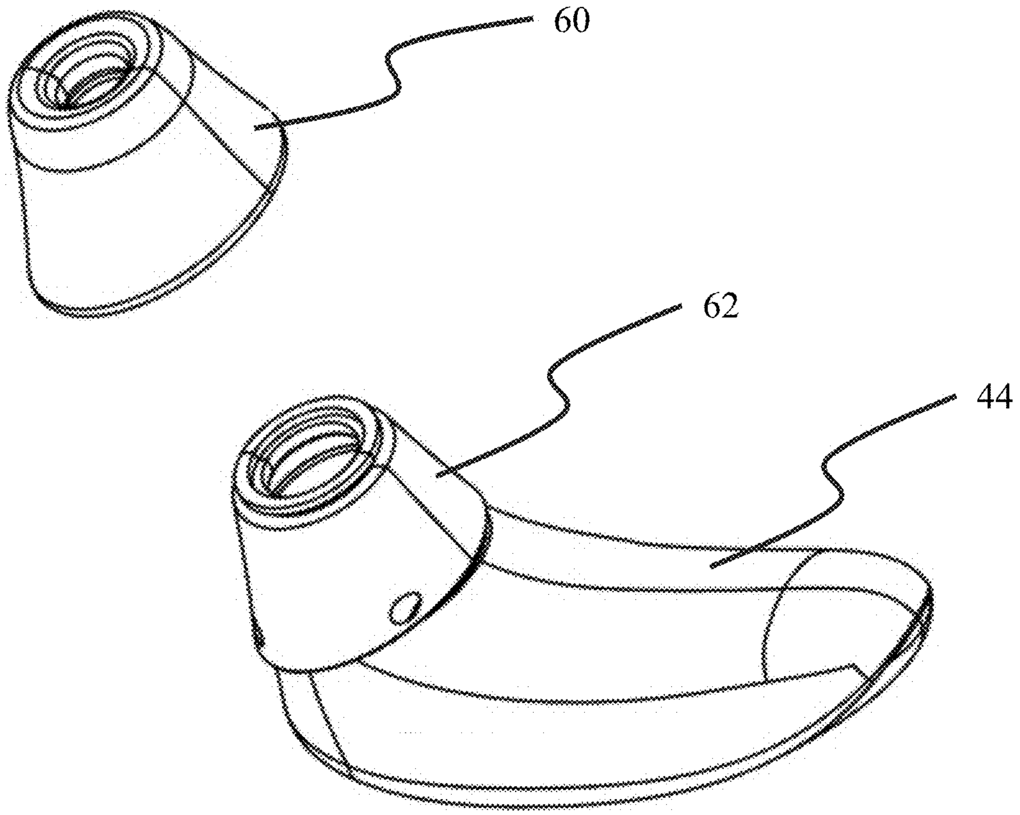
FIG. 7 is an exploded perspective view of the sexual stimulation device in accordance with exemplary embodiments of the present disclosure.

FIG. 7 is an exploded perspective view of the sexual stimulation device 100 in accordance with exemplary embodiments of the present disclosure. As can be appreciated by this figure, the cover skin 44 of the main portion of the device 100 may include a head unit base 62 for receiving the flexible head unit 60, which may include the elements of the removable portion discussed above. The head unit base 62 may act to protect the interior of the device when the flexible head unit 60 is removed therefrom and may provide a means of removably locking the flexible head unit 60 into place, for example, with clips, bumps, channels, magnets, friction/pressure fittings, etc.

Figure 8:
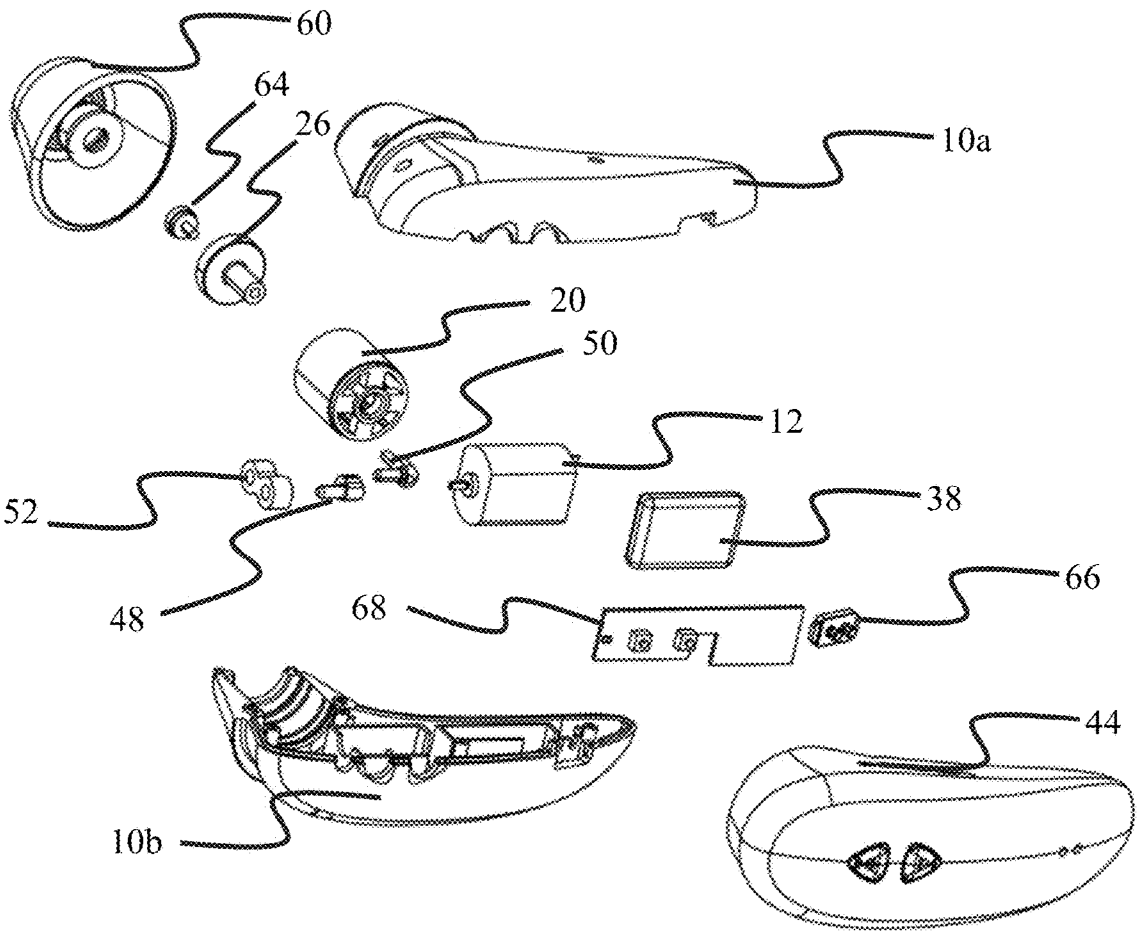
FIG. 8 is an exploded perspective view of the sexual stimulation device in accordance with exemplary embodiments of the present disclosure.

FIG. 8 is an exploded perspective view of the sexual stimulation device in accordance with exemplary embodiments of the present disclosure. As can be seen from this picture, the cover 44 may be a protective skin that provides for enhanced grip, water resistance, and a pleasing hand feel. The cover 44 may include openings for charging ports and/or data ports 66 as well as buttons and other forms of controls 40 and/or displays. The housing 10 may be made up of two joining parts including an upper housing 10*a* and a lower housing 10*b*. The housing 10 may include one or more partitions for fixing and supporting the various internal components. For example, a PCB 68 may be disposed therein for accommodating logic circuits, radios, and mounted switches for the button/controls 40. The charging and/or data ports 66 may also be mounted internally as a PCB. These ports may be embodied as, for example, pogo pins, electrical contacts, a USB connector, or a barrel power connector.

The battery 38, the motor, and the associated transfer arrangement 14, including the motor-side arm 48, the plug-side arm 50, and the joiner 52, may each be accommodated within the housing 10. The stationary backing 20 may include the flexible stimulation front 28 disposed therein and the ridged plug 26 may plug the flexile stimulation front 28 and fix it to the stationary backing 20. A clip 64 may be used to lock the ridged plug 26 in place. The flexible head unit 60 may then lock into place thereover.

Figure 9:
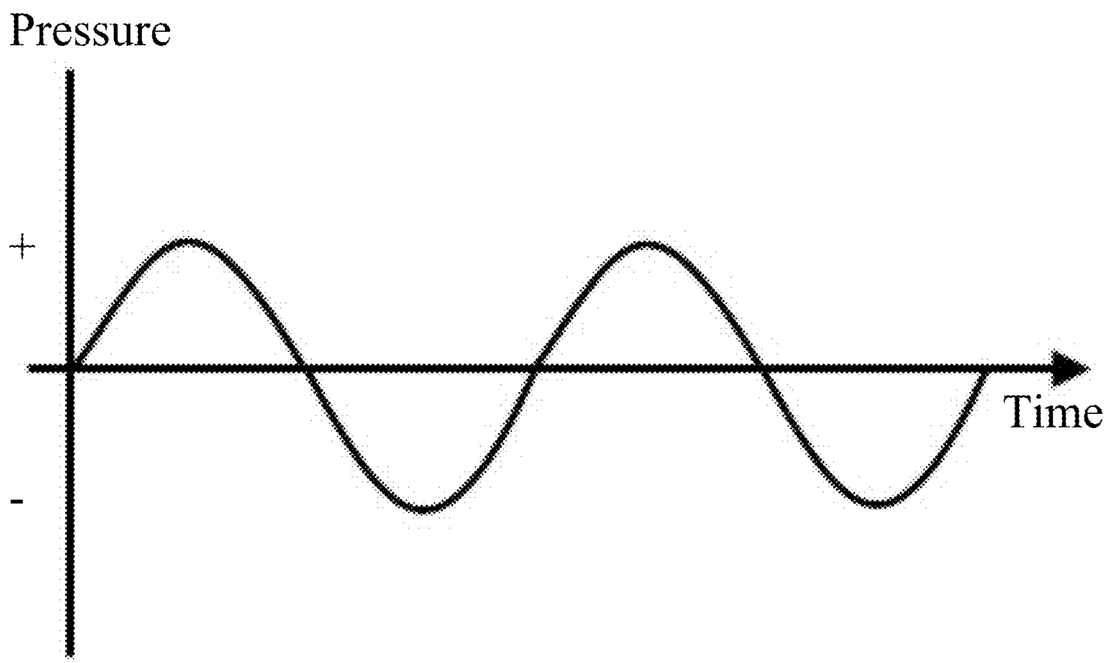
FIG. 9 is a graph showing positive and negative pressure provided by the sexual stimulation device in accordance with exemplary embodiments of the present disclosure.

FIG. 9 is a graph showing positive and negative pressure provided by the sexual stimulation device in accordance with exemplary embodiments of the present disclosure. As discussed above, the pressure field generator 34 is configured to change its volume so as to expand the volume of its first region 34_a_ while it contracts the volume of its second unit 34_b_ and vice versa. As the first region 34_a_ contracts, a positive pressure is provided and then as the first region 34_a_ expands, a negative pressure is provided. The pressure provided from the opening 30 therefore follows a substantially sinusoidal pattern, as shown, so as to provide a natural alternating pressure so as to stimulate the erogenous zones of the user. Alternatively, however, the pressure graph may be a square wave pattern where the pressure is a constant positive pressure followed by a constant negative pressure, etc., rather than the smooth transition discussed above. Pressure patterns may be controlled by the controller and user-selectable.

It is noted that U.S. Pat. No. 9,849,061 (referred to herein as "Lenke") pertains to a sexual stimulation device in which there is a pressure field generator for stimulating an erogenous zone of a user by providing alternating positive and negative pressure to the clitoris for stimulation. This U.S. Patent was the subject of an inter partes review, trial number IPR2020-00007. During this inter partes review, the patentability of Lenke was called into question in light of U.S. Pat. No. 5,725,473 (referred to herein as "Taylor"). It was argued by the Petitioner in the inter partes review that Taylor rendered Lenke obvious by teaching the application of alternating positive and negative pressure with respect to a reference pressure, a recited element of the Lenke patent. The Patent Owner in turn argued that Lenke was patentable over Taylor because Taylor teaches a cyclical vacuum and not modulated negative and positive pressure with respect to a reference pressure, as recited in the claims of Lenke.

In making its argument, the Patent Holder introduced expert testimony of Morten Olgaard Jensen, Ph.D. who considered that the bellows of Taylor could not provide modulated negative and positive pressure with respect to a reference pressure, as recited in the claims of Lenke. The holding of the inter partes review agreed with this determination.

It is noted that according to exemplary embodiments of the present disclosure, modulated negative and positive pressure, with respect to a reference pressure, is provided, at least in part, by the guide assembly that is configured to limit lateral motion of the movable end portion.

One possible reason for Dr. Jensen's contention that Taylor could not generate a positive pressure pattern with respect to the reference pressure was the limited expansion stroke of the bellows, which was limited by the fact that bellows that are excessively long are highly susceptible to lateral deflections during the expansion and contraction phases, which can lead to the inability to generate a stable pressure field. Conversely, a small expansion stroke results in a relatively minor volume change of the pressure field within the bellows. The volume change of the generator is insufficient to generate a positive pressure relative to the reference pressure.

In light of the above, exemplary embodiments of the present disclosure have been designed to utilize a structure to prevent lateral deflection of the bellows, such as the aforementioned a guide assembly that is configured to limit lateral motion of the movable end portion. This arranging allows for the expansion stroke of the bellows to be expanded to its fullest extent, thereby enabling the pressure field generator to generate a stronger positive pressure with respect to the reference pressure.

Figure 10:
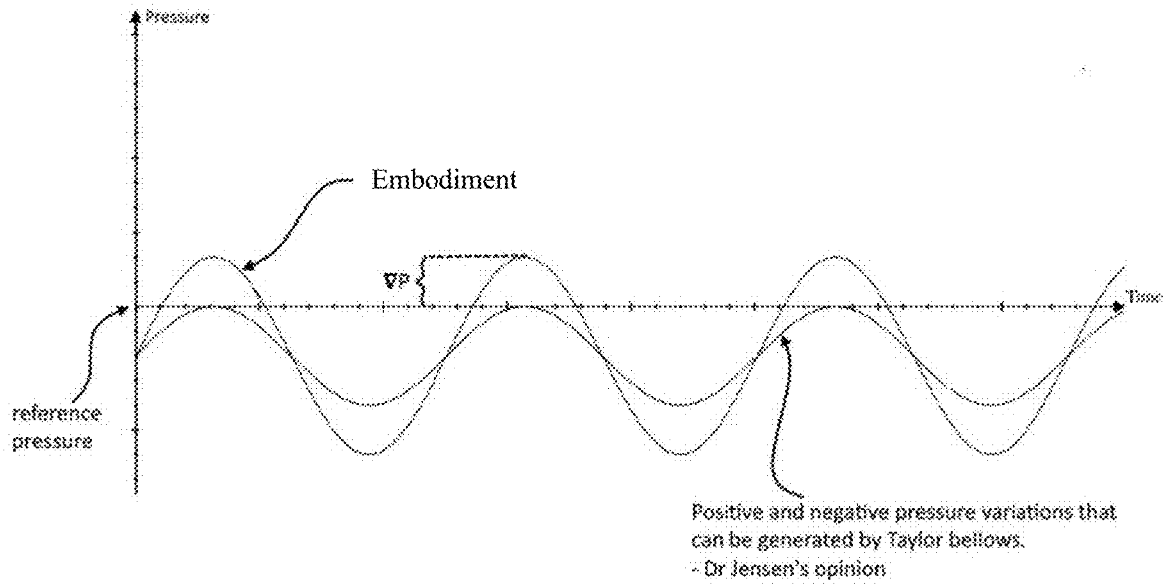
FIG. 10 is a graph showing pressure patterns provided by the sexual stimulation device and comparative examples.

FIG. 10 is a graph showing pressure patterns provided by the sexual stimulation device and comparative examples, notably, the positive and negative pressure variation that are capable of being generated by the bellows of Taylor, according to the findings of Dr. Jensen in the inter partes review discussed above.

The reference pressure is understood herein to be the maximum value of the positive pressure that can be generated by an unlengthened bellows. The arrangement of Taylor thereby only produces positive and negative pressure variations that are below the reference pressure.

Exemplary embodiments of the present disclosure provide a higher maximum pressure that is above the reference pressure by a pressure difference $\Delta P$, and accordingly, the sexually stimulating apparatus according to exemplary embodiments of the present disclosure are able to produce the technical effect that the "generated stimulating pressure field comprises a pattern of negative and positive pressures, modulated onto with respect to a reference pressure", as shown in FIG. 10. Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A device for stimulating an erogenous zone of a human body, comprising:
- a housing;
- a driver disposed inside the housing;
- a pressure field generator disposed at least partially inside the housing, the pressure field generator comprising:
  - a cavity having a movable portion and a stimulating portion opposite thereto, at least a portion of the cavity defined by a tube wall connecting the movable portion and the stimulating portion, wherein at least a portion of the tube wall is an axial-length-variable tubular structure; and
  - a pusher configured to drive the movable portion in a reciprocating manner using a force of the driver, wherein the stimulating portion has an opening of the cavity configured to engage with an erogenous zone of a human body; and
- a guide assembly configured to limit lateral motion of the movable portion, the guide assembly comprising:
- a slider component coupled to the pusher and actuated by the driver, and
- a lead rail component configured to limit the slider component,
- wherein the slider component reciprocally slides on the lead rail component by mating therewith as the slider component is actuated by the driver.

2. The device claimed in claim 1, wherein the driver comprises a rotating motor and a crank-link mechanism driven by the rotating motor, having a connecting rod configured to connect with the pusher.

3. The device claimed in claim 2, wherein the guide assembly comprises a guide rail disposed inside the housing and configured to restrict lateral oscillation of the connecting rod.

4. The device claimed in claim 2, wherein the pusher comprises:
- a rigid plug configured to close the movable portion; and
- a column connected to the rigid plug and configured to couple to the connecting rod,
- wherein the movable portion is gripped by the rigid plug and the lead rail component.

5. The device claimed in claim 1, wherein at least a portion of the lead rail component surrounds the axial-length-variable tubular structure, and a gap is left between the lead rail component and the axial-length-variable tubular structure.

6. The device claimed in claim 1, wherein the lead rail component is a cylindrical guide having at least one pair of elongate ribs axially arranged on an inner side wall thereof, and wherein the slider component is a pallet limited by the at least one pair of elongate ribs within the cylindrical guide.

7. The device claimed in claim 6, wherein the cylindrical guide comprises a first region and a second region, and wherein the pallet comprises a first surface facing the pressure field generator and a second surface facing away from the pressure field generator, wherein the first region is defined by the first surface and a first sidewall of the cylindrical guide located on a side where the first surface is located, and the second region is defined by the second surface and a sidewall of the cylindrical guide located on a side where the second surface is located, and wherein a total volume of the first region and the second region remains substantially constant during the reciprocation of the movable portion.

8. The device claimed in claim 6, wherein the cylindrical guide is in fluid communication with an air escape structure.

9. The device claimed in claim 1, wherein the axial-length-variable tubular structure is a bellows.

10. The device claimed in claim 9, wherein the bellows is compressed to a minimum length, due to an elasticity of the bellows or with an assistance of an elastic restorer and has a potential energy to spring back the movable portion.

11. The device claimed in claim 1, wherein the axial-length-variable tubular structure is an axially deformable hose.

12. A device for stimulating an erogenous zone of a human body, comprising:

a housing;

a driver disposed inside the housing; and a pressure field generator disposed at least partially inside the housing, comprising:

a continuous cavity having a movable end and a stimulating end opposite thereto, the continuous cavity defined by a tube wall connecting the movable end and the stimulating end, wherein at least a portion of the tube wall is an axial-length-variable tubular structure; and a pusher configured to close the movable end and to drive the movable end in a reciprocating manner using a force of the driver, wherein the stimulating end is integrally molded with the tube wall and has an opening of the continuous cavity configured to engage with an erogenous zone of a human body, and wherein the pusher is configured to detach the pressure field generator from a remainder of the device.

13. The device claimed in claim 12, wherein the stimulating end further comprises:

an inner portion configured to connect the tube wall;

an outer portion surrounding the continuous cavity; and a contact portion connecting the inner portion and the outer portion, wherein the contact portion is configured to be in contact with a surface of the human body as the opening comes into engagement with the erogenous zone of the human body.

14. The device claimed in claim 12, further comprising a cover configured to cover at least a portion of the housing.

15. A device for stimulating an erogenous zone of a human body, comprising:

a housing;

a driver disposed inside the housing; and a pressure field generator disposed at least partially inside the housing, comprising:

a continuous cavity having a movable end and a stimulating end opposite thereto, the continuous cavity defined by a tube wall connecting the movable end and the stimulating end, wherein at least a portion of the tube wall is an axial-length-variable tubular structure; and a pusher configured to close the movable end and to drive the movable end in a reciprocating manner using a force of the driver, wherein the stimulating end is integrally molded with the tube wall and has an opening of the continuous cavity configured to engage with an erogenous zone of a human body, and wherein the pusher comprises:

a rigid plug configured to close the movable end; and a coupling closing the movable end by mating with the rigid plug, the coupling being configured to couple with the driver, and wherein the pusher is configured to detach the pressure field generator from the remainder of the device by decoupling the coupling from the driver.

16. The device claimed in claim 15, further comprising a guiding assembly configured to limit motion of the movable end to a reciprocating motion, to prevent lateral movement or sway, and to guide the coupling to mate with the driver.

* * * * *